(12) United States Patent
Sheikh et al.

(10) Patent No.: US 12,313,720 B2
(45) Date of Patent: May 27, 2025

(54) MULTI-CARRIER PHASE DIFFERENCE DISTANCE ESTIMATION

(71) Applicant: Stichting IMEC Nederland, Eindhoven (NL)

(72) Inventors: Alireza Sheikh, Eindhoven (NL); Jac Romme, Schiedam (NL)

(73) Assignee: Stichting IMEC Nederland, Eindhoven (NL)

( * ) Notice: Subject to any disclaimer, the term of this patent is extended or adjusted under 35 U.S.C. 154(b) by 401 days.

(21) Appl. No.: 18/068,806

(22) Filed: Dec. 20, 2022

(65) Prior Publication Data

US 2023/0204745 A1 Jun. 29, 2023

(30) Foreign Application Priority Data

Dec. 23, 2021 (EP) .................................... 21217250

(51) Int. Cl.
*H04W 24/08* (2009.01)
*G01S 11/02* (2010.01)

(52) U.S. Cl.
CPC ............. *G01S 11/02* (2013.01); *H04W 24/08* (2013.01)

(58) Field of Classification Search
CPC ........ G01S 11/02; G01S 13/825; G01S 13/84; H04W 24/08
See application file for complete search history.

(56) References Cited

U.S. PATENT DOCUMENTS

| | | | |
|---|---|---|---|
| 2019/0187263 A1* | 6/2019 | Romme | G01S 11/06 |
| 2021/0021297 A1 | 1/2021 | Smyth et al. | |
| 2021/0025962 A1 | 1/2021 | Smyth et al. | |
| 2021/0124061 A1* | 4/2021 | Hiscock | G01S 11/02 |
| 2021/0373149 A1 | 12/2021 | Zand et al. | |
| 2024/0022887 A1* | 1/2024 | Wulff | H04W 8/005 |
| 2024/0430842 A1* | 12/2024 | Sun | H04B 7/0626 |

FOREIGN PATENT DOCUMENTS

| | | |
|---|---|---|
| EP | 3502736 A1 | 6/2019 |
| EP | 3839562 A1 | 6/2021 |

OTHER PUBLICATIONS

Extended European Search Report and Written Opinion, Application No. EP 21217250.6, mailed Jun. 13, 2022, 4 pages.
(Continued)

*Primary Examiner* — Meng Vang
*Assistant Examiner* — Hector Reyes
(74) *Attorney, Agent, or Firm* — McDonnell Boehnen Hulbert & Berghoff LLP

(57) ABSTRACT

Examples relate to a method for performing multi-carrier phase-based ranging between two radios including: i) calculating squared channel responses based on channel measurements between the two radios for a plurality of available carriers within a measurement band for the phase-based ranging, where the measurement band has at least one band gap each with one or more unusable carriers for calculating squared channel responses, ii) estimating, via a trained neural network, squared channel responses for the unusable carriers in a respective band gap from squared channel responses of carriers adjacent to the respective band gap, and iii) estimating a distance between the two radios based on both the calculated and estimated squared channel responses.

20 Claims, 5 Drawing Sheets

(56) References Cited

OTHER PUBLICATIONS

Liu, Peng, Wangdong Qi, Yue Zhang, and Li Wei. "On the unambiguous distance of multicarrier phase ranging with random hopped frequencies." IEEE Access 5 (2017): 10296-10306.
Hsiao, Yao-Shan, Mingyu Yang, and Hun-Seok Kim. "Super-resolution time-of-arrival estimation using neural networks." In 2020 28th European Signal Processing Conference (EUSIPCO), pp. 1692-1696. IEEE, 2021.
Saikrishna, Pedamalli, Ashok Kumar Reddy Chavva, Mukul Beniwal, and Ankur Goyal. "Deep Learning Based Channel Estimation with Flexible Delay and Doppler Networks for 5G NR." In 2021 IEEE Wireless Communications and Networking Conference (WCNC), pp. 1-6. IEEE, 2021.
Omri, A., R. Bouallegue, R. Hamila, and M. Hasna. "Channel estimation for LTE uplink system by perceptron neural network." International Journal of Wireless & Mobile Networks (IJWMN) 2, No. 3 (2010): 155-165.
Soltani, Mehran, Vahid Pourahmadi, Ali Mirzaei, and Hamid Sheikhzadeh. "Deep learning-based channel estimation." EEE Communications Letters 23, No. 4 (2019): 652-655.
Izacard, Gautier, Brett Bernstein, and Carlos Fernandez-Granda. "A learning-based framework for line-spectra super-resolution." In ICASSP 2019-2019 IEEE International Conference on Acoustics, Speech and Signal Processing (ICASSP), pp. 3632-3636. IEEE, 2019.
Liao, Wenjing, and Albert Fannjiang. "Music for single-snapshot spectral estimation: Stability and super-resolution." Applied and Computational Harmonic Analysis 40, No. 1 (2016): 33-67.
Saleh, Adel AM, and Reinaldo Valenzuela. "A statistical model for indoor multipath propagation." IEEE Journal on selected areas in communications 5, No. 2 (1987): 128-137.

\* cited by examiner

MULTI-CARRIER PHASE DIFFERENCE DISTANCE ESTIMATION

CROSS-REFERENCE TO RELATED APPLICATIONS

The present application is a non-provisional patent application claiming priority to European Patent Application No. 21217250.6, filed Dec. 23, 2021, the contents of which are hereby incorporated by reference.

FIELD OF THE DISCLOSURE

Various example embodiments relate to multi-carrier phase-based ranging between two radios.

BACKGROUND

The range or distance between two radio transmitters can be estimated based on the phase difference between two tones at different carrier frequencies exchanged between two radios. One of the radios is sometimes referred to as the initiator and the other radio as the reflector, wherein the initiator typically initiates the ranging procedure. The measured phase difference or phase shift is caused by the time delay of the line-of-sight (LOS) path between the radios which in turn directly relates to the distance between the radios.

One problem with phase-based ranging is that multiple propagation paths, for example, non-line-of-sight (NLOS), paths can exist between the radios. These additional radio propagation paths will degrade the performance of the phase-based ranging. To mitigate this multi-path effect, multi-carrier phase difference (MCPD) ranging can be performed. In MCPC ranging the phase difference is measured for multiple carriers or tones within a certain measurement bandwidth. For example, tones can be exchanged in the 2.4 GHz ISM band where an 80 MHz bandwidth is available.

Further improvements have been obtained by using super-resolution algorithms. These algorithms use estimations of the channel responses for the different carriers instead of the phase differences. To estimate the channel responses, a sequence of tones at the different carriers is transmitted at both radios. Based on the measured tones, an approximation of the squared channel response for each carrier can be made from which the actual channel responses are reconstructed. One implementation of such super-resolution algorithm has been disclosed in Wenjing Liao, Albert Fannjiang "MUSIC for single-snapshot spectral estimation: Stability and super-resolution," Applied and Computational Harmonic Analysis, Volume 40, Issue 1, 2016. Another implementation has been proposed by P. Boer, J. Romme, J. Govers and G. Dolmans in "Performance of High-Accuracy Phase-Based Ranging in Multipath Environments," 2020 IEEE 91st Vehicular Technology Conference (VTC2020-Spring), 2020, pp. 1-5.

A problem with the above techniques is that not all carriers within the measurement band are always available or even usable. For example, some carriers may be distorted by interfering radios or may be unavailable for use due to protocol restrictions. This results in band gaps within the measurement band that degrades the ranging performance significantly compared to the case where no such band gaps are present.

SUMMARY

Amongst others, it is a potential benefit of embodiments of the disclosure to alleviate the identified problems and to provide a method of multi-carrier phase-based ranging between two radios.

A first example aspect of the present disclosure includes a computer-implemented method for performing multi-carrier phase-based ranging between two radios. The method comprises: i) calculating squared channel responses based on channel measurements between the two radios for a plurality of available carriers within a measurement band for the phase-based ranging; and wherein the measurement band has at least one band gap each with one or more unusable carriers for calculating squared channel responses; ii) estimating, by means of a trained neural network, squared channel responses for the unusable carriers in a respective band gap from squared channel responses of carriers adjacent to the respective band gap; and iii) estimating a distance between the two radios based on both the calculated and estimated squared channel responses.

In other words, the method includes an estimation of the squared channel responses within a band gap by a trained neural network, i.e. a neural network that is trained to estimate the squared channel responses within the band gap based on squared channel responses that are adjacent to the band gap.

The range estimation according to the method of the disclosure can be more accurate even though additional measurements might not be needed. Instead of omitting the band gaps or padding them with a fixed pre-determined value, e.g. zero, the squared channel responses are recovered from adjacent channel responses. The complexity of a recovery by such a neural network is negligible compared to the estimation of the distance itself and, hence, does not add significant computational requirements. Further, the method is compatible with existing techniques for calculating the squared channel responses and estimating the distance between radios. For example, the method could be used for ranging in the 2.4 GHz ISM band where an 80 MHz bandwidth is available.

According to an example embodiment, the squared channel responses of carriers adjacent to a respective band gap comprise first squared channel responses of carriers adjacent to and having a lower frequency than the band gap and second squared channel responses of carriers adjacent to and having a higher frequency than the band gap.

For example, the number of carriers adjacent to and having a lower frequency than the band gap and the number of carriers adjacent to and having a higher frequency than the band gap is greater than or equal to the number of unavailable carriers in the respective band gap. Simulations and experiments have shown that a neural network with input nodes of one time the band gap of adjacent higher frequency carriers and of one time the band gap of adjacent lower frequency carriers provide improvements in the range estimation. By choosing less or more input nodes, the accuracy can be further decreased or improved in exchange for less or more computational complexity, respectively.

The channel measurements may be obtained from a sequence of tones transmitted by both radios over at least the frequencies of the available carriers within the measurement band. Both radios then measure the received tones to obtain the channel measurements. Such channel measurements may be expressed by an in-phase component and a quadrature component, sometimes referred to as IQ measurement. Alternatively, channel measurements may be expressed by a phase and amplitude component.

The squared channel response of the available channels can be based on a multiplication of the channel measurements at one radio with the respective channel measurements at the other radio. Such a multiplication, which has a relatively low complexity, results in a good approximation of the squared channel response.

According to example embodiments, the estimating the squared channel responses for the unusable carriers further comprises selecting the trained neural network from a set of trained neural networks according to the number of unusable carriers in the at least one band gap. In other words, each neural network of the set is trained for a specific band gap width. During the estimating step, the neural network trained for the specific band gap width is selected from the set to perform the actual recovery within the band gap.

According to further example embodiments, at least one trained neural network of the set is configured to perform the estimating for different numbers of unusable carriers. More particularly, a neural network trained for a certain band gap width can be pruned by removing input and output nodes such that it can estimate squared channel responses for smaller band gap widths. This further reduces the amount of training complexity as well as the storage needed for the set of neural networks.

According to example embodiments, the measurement band can have a plurality of band gaps each having one or more unavailable carriers. The estimating step can than further comprise: i) determining an estimation order for the estimating; and ii) estimating squared channel responses for the unusable carriers in the plurality of band gaps according to the estimation order. By such an estimation order, dependencies in estimation of squared channel responses between different band gaps can be resolved.

The estimation order may be determined according to a condition that: if estimating squared channel responses of a second bandgap requires squared channel responses of a first band gap, then estimate the channel responses of the first band gap before the channel responses of a second bandgap. As a result, recovered squared channel responses of the first band gap can be used as input of the neural network for recovering the squared channel responses of the second band gap.

A further condition may be formulated as: if estimating squared channel responses of a second bandgap requires squared channel responses of a first band gap and vice versa, and if the first band gap is smaller than the second band gap, then estimate the channel responses of the first band gap first.

According to a second example aspect, the current disclosure relates to a controller comprising at least one processor and at least one memory including computer program code, the at least one memory and computer program code configured to, with the at least one processor, cause the controller to perform the method according to the first example aspect.

According to a third example aspect, the current disclosure relates to a computer program product comprising computer-executable instructions for performing the method according to the first example aspect when the program is run on a computer.

According to a fourth example aspect, the current disclosure relates to a computer readable storage medium comprising the computer program product according to the third example aspect.

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 1:
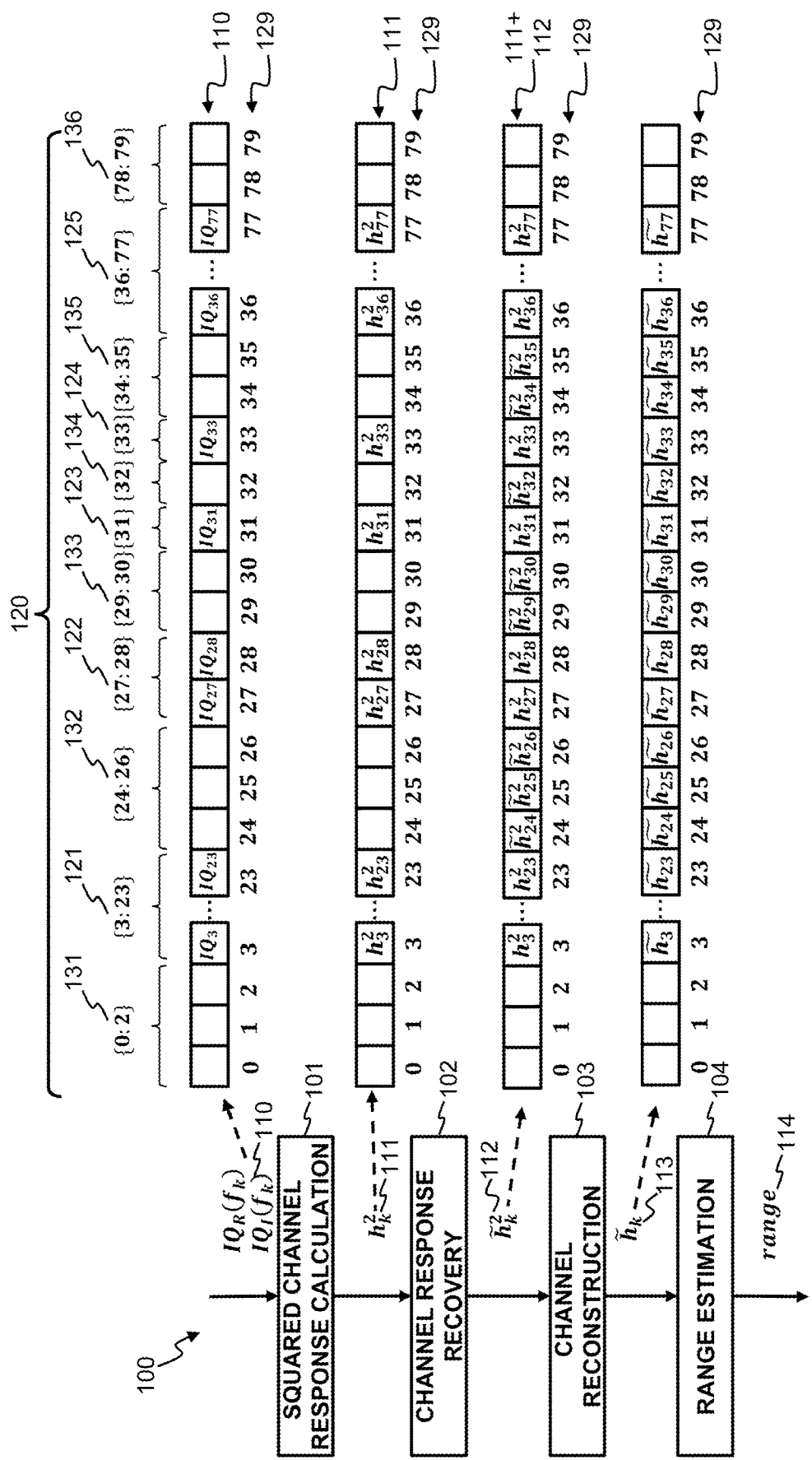
FIG. 1 shows a method for estimating a distance between radios from channel measurements, according to an example.

FIG. 1 illustrates steps 101-104 of a method 100 (e.g., a multi-carrier phase-based ranging method) for determining the range 114 between two radios from the measurements 110. In this disclosure, one radio is further referred to as the initiator (I) and the other radio as the reflector (R). The measurements 110 (e.g., IQ measurements) are obtained from both the initiator and the reflector. The measurements are performed over a certain measurement band 120 and for different frequencies or carriers, hence the name multi-carrier. In this description, examples are described for 80 channels or carriers in an 80 MHz measurement band. Such 80 MHz band is, for example, available in the 2.4 GHz ISM band. A certain frequency channel is further characterized by a channel index k. In the described examples $k \in \{0, +1, \ldots, 79\}$ as also illustrated by the indices 129 of FIG. 1. To obtain the channel measurements, the initiator may transmit a series of tones in the different carriers 129, i.e. a signal having a single frequency corresponding to the carriers 129 and having a constant phase. These tones are then received by the reflector, downmixed, and sampled to obtain an IQ measurement $IQ_R(f_k)$ wherein $f_k$ is the frequency corresponding to the channel index k. Vice versa, the reflector may also transmit a series of tones in the different channels 129. These tones are then received by the initiator, downmixed, and sampled to obtain an IQ measurement $IQ_I(f_k)$. The IQ measurement may be represented by an in-phase and quadrature component or by polar coordinates as commonly used in the art. The IQ measurements at both initiator and reflector can be represented by the following equations:

$$IQ_R(f_k) = e^{\theta_k} h_k + n_k, k \in \{0, +1, \ldots, 79\} \quad \text{(Eq. 1)}$$

$$IQ_I(f_k) = e^{-\theta_k} h_k + \acute{n}_k, k \in \{0, +1, \ldots, 79\} \quad \text{(Eq. 2)}$$

The superscripts R and I refer to the initiator and reflector, $\theta_k$ is a uniformly random phase due to noncoherent frequency switching at the k-th frequency channel by the initiator or reflector, $n_k$ and $\acute{n}_k$ are a zero-mean independent Gaussian noises, and $h_k$ is the channel response for the k-th frequency channel. Assuming that there are N multiple paths between the two radios, i.e. a multipath channel, then the channel response $h_k$ may be further defined as:

$$h_k = \sum_{n=0}^{N-1} a_n \exp(-j(\omega_0)\tau_n)\exp(-jk\Delta\omega\tau_n) \quad \text{(Eq. 3)}$$

$\omega_0 = 2\pi f_0$, $f_0$ is the lowest carrier frequency, $\Delta\omega = 2\pi\Delta f$, $\Delta f$ is the frequency sweep step-size, i.e. the width of the frequency channels; $a_n$ and $\tau_n$ are the complex amplitude and the delay corresponding to the n-th multi-path component of the N multiple paths, and k is the index of the frequency channel.

EP3839562A1 discloses one example of steps to obtain the measurements 110 between an initiator and a reflector. According to this disclosure, the acquisition of the measurements 110 may start with the initiator and reflector by agreeing on the ranging parameters, aligning their frequencies, e.g. by using carrier frequency offset (CFO) estimation and calibration, and realizing coarse time synchronization. Course time synchronization can be done by starting at both initiator and reflector a digital counter at the transmission/reception of a start frame delimiter (SFD) which both radio devices use to control a local state machine. The synchronized state machines then control when and what each transceiver is doing. Thereafter, the measurements may be performed according to the following steps: i) both initiator and reflector configure a respective local oscillator (LO) to a predetermined frequency channel k and configure a loop counter to zero, ii) the initiator transmits its LO signal and the reflector performs a measurement of the Cartesian components, i.e. the in-phase and quadrature component $IQ_R(f_k)$, of the signal received at the reflector relative to its own local oscillator, iii) the two devices change the transmit direction and allow a guard time for stabilizing their local oscillators, iii) the reflector transmits its LO signal and the initiator now performs a measurement of the Cartesian components, i.e. the in-phase and quadrature component $IQ_I(f_k)$, of the signal received at the initiator relative to its own local oscillator, iv) both initiator and reflector increase the frequency of their respective LOs by the frequency sweep step-size $\Delta f$ and return to step i). This loop is repeated for a predetermined number of times resulting in measurements for at least all available carriers 121 to 125 (e.g., channels). The carriers may also be processed in a different order, e.g. in a decreasing order or in a random order. Both initiator and reflector have respective phase-locked loops (PLLs) to generate their respective local oscillator (LO) signals.

The measurements 110 for different carriers 129 are obtained according to the method 100 as input for the step 101. Not every carrier 129 within the measurement band 120 has a usable IQ measurement. In the example, the measurement for carriers 0 to 2, 24 to 26, 29 to 30, 32, 34, 35, 78 and 79 are not usable by the method 100. The band gaps 131, 132, 133, 134, 135 and 136 are further referred to as band gaps with unusable carriers within the measurement band 120. These gaps may be unusable or even unavailable because some carriers may be distorted by interfering radios or may be unavailable for use due to protocol restrictions. The carriers 121, 122, 123, 124 and 125 for which usable IQ measurements are available are further referred to as available carriers with usable IQ measurements.

In step 101, the squared channel response 111 is then calculated for each of the available carriers 121-122 from the measurements 110 wherein the squared channel response of a frequency channel k is defined as the square of channel response, i.e. $h_k^2$. From Eqs. 1 and 2, the square of the channel response for k-th frequency channel can be estimated based on the measured IQ samples as follows:

$$h_k^2 \approx IQ_R(f_k)IQ_I(f_k) \quad \text{(Eq. 4)}$$

In a next step, the channel recovery step 102, the estimated squared channel responses 111 from the previous steps are used to recover the squared channel response for the channel gaps 132-135. The outer band gaps 131 and 136 are not recovered as further described below. The recovered squared channel responses are represented as $\tilde{h}_k^2$ wherein k is the channel index of the channel gaps 132-135. To perform this recovery, a trained neural network is used to estimate the squared channel responses for the unusable carriers in a certain channel gap 132-135 from the squared channel responses 111 adjacent to these unusable carriers. Example embodiments of this neural network are described further below.

In the next step 103, the channel responses $\tilde{h}_k$ (113) are determined from the measured squared channel responses $h_k^2$ (111) and recovered squared channel responses $\tilde{h}_k^2$ (112). In principle, a channel response could be obtained from a squared channel response as follows:

$$\tilde{h}_k = \sqrt[2]{IQ_R(f_k)IQ_I(f_k)} = c_k h_k, c_k \in \{\pm 1\} \quad \text{(Eq. 5)}$$

As it can be seen from Eq. 5, there is a sign ambiguity $c_k$ (see $c_k \in \{\pm 1\}$) in the estimated frequency channel response $\tilde{h}_k$. Known solutions can be used to solve this sign ambiguity. One solution referred to as channel reconstruction is proposed in EP3502736A1 wherein the progression of the phase of estimated channel responses over different frequencies is estimated. The estimation is performed by using linear extrapolation and corrects for the unexpected phase variation due to wrong signs. As such, the sign ambiguity is resolved by ensuring the phase structure along the frequency dimension.

The so-obtained channel responses are then used in next step, the final range estimation step 104, to estimate the range 114 between the radios. Different techniques are known in the art for performing range estimation from channel responses. One technique is referred to as super resolution algorithms that estimate the line of sight (LOS) path $\tau_0$ as defined in Eq. 3. One such super resolution algorithm is for example disclosed in Wenjing Liao, Albert Fannjiang "MUSIC for single-snapshot spectral estimation: Stability and super-resolution," Applied and Computational Harmonic Analysis, Volume 40, Issue 1, 2016. In this publication, a super resolution algorithm is disclosed for the line spectral problem. The goal of solving this problem is to estimate the underlying frequencies and amplitudes of a superimposed complex exponential signal. The publication discloses construction of a Hankel matrix from an observation vector and then applies the disclosed MUSIC algorithm to estimate the underlying frequencies and amplitudes.

The range 114 as obtained from method 100 is more accurate than when performing the range estimation by the same super resolution algorithm without channel recovery step 102, for example, when assuming a padded channel response for the channel gaps 132-135 with a predefined value $\tilde{h}_k = 0$.

Figure 2:
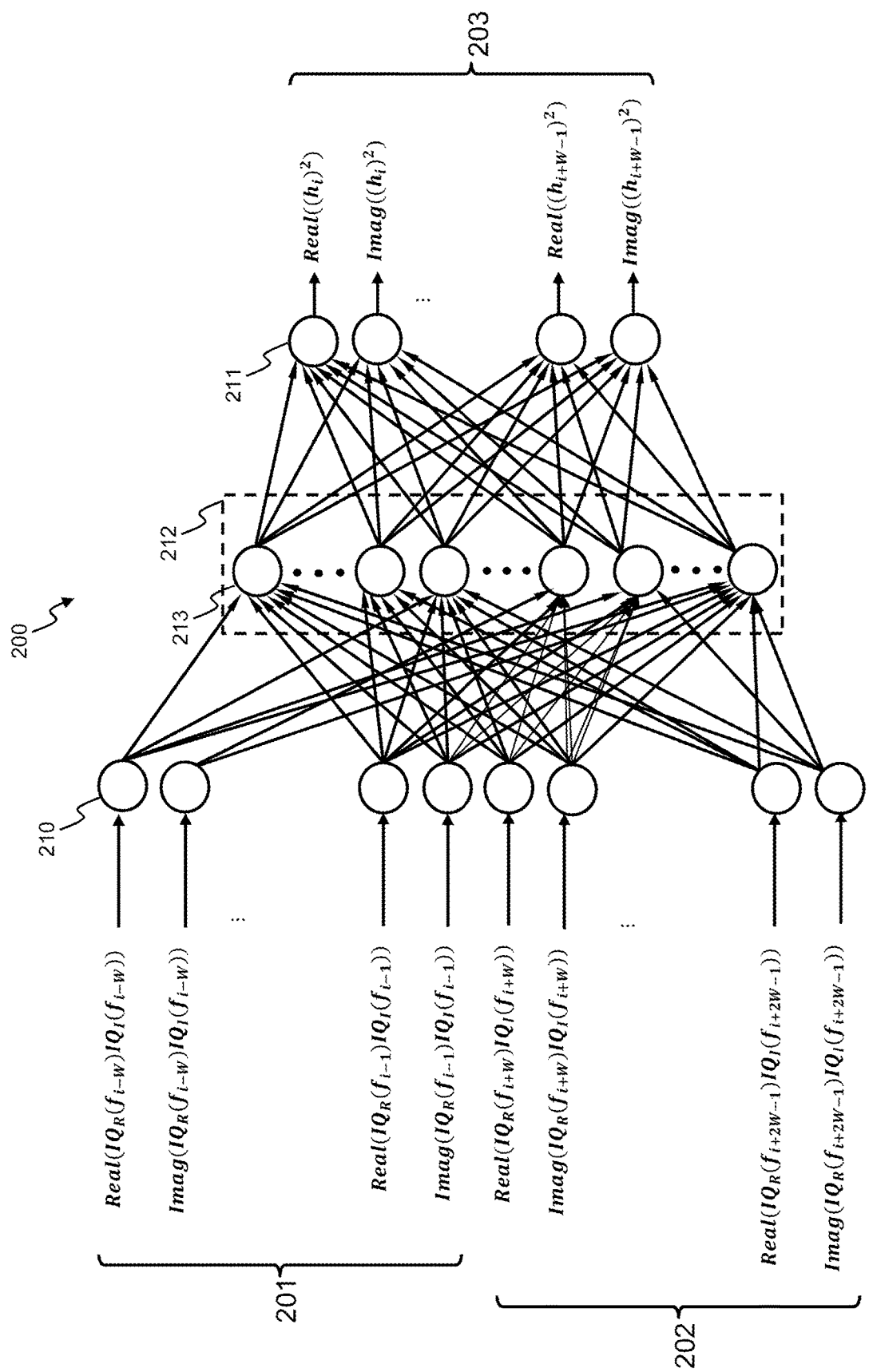
FIG. 2 shows a neural network architecture for estimating squared channel responses within a band gap in a measurement band, according to an example.

FIG. 2 illustrates an architecture of a neural network 200 according to an example embodiment that takes squared channel responses 201 and squared channel responses 202 as input and generates recovered squared channel responses 203. The neural network 200 can be used for estimating the squared channel responses 112 for one of the channel gaps 132-135 based on the measurements 110 (e.g., measured squared channel responses). As such, the neural network 200 is trained to estimate the squared channel responses 203 for carriers of a band gap having a number of W unusable carriers or having a width W. As such, the squared channel responses 203 can be represented by squared channel responses $(h_i)^2$ to $(h_{i+w-1})^2$ wherein i is the lowest carrier index of the channel gap. As the channel response $h_i$ can be represented by a complex number, the squared channel responses 203 of the neural network 200 comprises both the real and imaginary part of the squared channel response represented by respectively $\text{Real}((h_i)^2)$ and $\text{Imag}((h_i)^2)$. This way the neural network 200 is defined as a real-valued neural network. The neural network 200 is trained to produce these squared channel responses 203 from a first set of the squared channel responses 201 of carriers that are adjacent to the band gap and have a lower frequency than the bandgap, and from a second set of the squared channel responses 202 that are adjacent to then band gap and have a higher frequency than the bandgap. In other words, the neural network 200 is trained to produce the squared channel responses 203 from channel responses of neighboring carriers around the band gap. The number of inputs needed to estimate a channel gap of width W is a design parameter. This parameter provides a performance and complexity trade-off in channel recovery, i.e. in the complexity and performance of the neural network 200. For example, there are around 2W inputs for a bandgap of width W, i.e. W squared channel responses 201 $(h_{i-W})^2$ to $(h_{i-1})^2$ below the bandgap and W squared channel responses 202 $(h_{i+W})^2$ to $(h_{i+2W-1})^2$ above the bandgap. As such, for a band gap of width W, neural network 200 has 4W neurons of the input layer 210 and 2W neurons of the output layer 211. As an activation function for the input layer 210, the rectifier or ReLU (Rectified Linear Unit) activation function is used. As the output layer 211 provides the real and imaginary component of the squared channel response, no activation function is used for the output layer.

According to an example, a minimum mean squared cost function is used for training the neural network 200. For example, a stochastic gradient descent (SGD) is used for the optimization, or by further example, Adaptive Moment Estimation (ADAM) with a learning rate of 0.001 is used. A set of around 1000 training samples and 50 epochs may be used during the training.

For example, the squared channel responses 201, the squared channel responses 202, and the squared channel responses 203 of the input layer 210 are normalized for training such that the mean of the input layer 210 and the output layer 211 is zero and the corresponding variance is one. Such normalization may further improve the convergence speed of the training of the neural network 200. Normalization can be performed according to the following equations $$x_{normalized} = \text{diag}(\sigma_{in})^{-1}(x - \mu_{in}), \text{ and} \quad \text{(Eq. 6)}$$

$$y_{normalized} = \text{diag}(\sigma_{out})^{-1}(y - \mu_{out}) \quad \text{(Eq. 7)}$$

wherein x is an input training sample having length 4W; $x_{normalized}$ is the normalized input training sample; y is an output training sample corresponding to x of length 2 W; $y_{normalized}$ is the normalized output training sample; $\mu_{in}$ and $\sigma_{in}$ are vectors of length 4 W corresponding to the mean and standard deviation of all input training examples; $\mu_{out}$ and $\sigma_{out}$ are vectors of length 2 W corresponding to the mean and standard deviation of all output training examples; and diag(.) is a diagonal function which transfers a vector to a square matrix, where the input vector is placed as the diagonal components of such matrix.

According to an example, the neural network 200 is trained by first generating a gap of width W with a random position within the measurement. Then, the IQ samples and corresponding squared channel response is determined based on a simulation model. In particular, the channel response for each tone $h_k$ can be generated using the Saleh-Valenzuela channel model. This model is known in the art for describing a multi-path indoor propagation environment and disclosed in A. A. M. Saleh and R. Valenzuela, "A Statistical Model for Indoor Multipath Propagation," in IEEE Journal on Selected Areas in Communications, vol. 5, no. 2, pp. 128-137, February 1987. Then, an exponent $e^{\theta_k}$ with uniformly random selected phase $\theta_k$ is generated to mimic the incoherent frequency switching which can be present in distance measurement techniques. Then, the IQ samples $IQ_R(f_k)$ and $IQ_I(f_k)$ are generated based on Eq. 1 and Eq. 2. For example, the parameters of the simulation model are randomly selected to mimic different fading conditions. As a result, the trained neural network 200 is usable in any unseen ranging setup and fading conditions. The so obtained IQ samples can then be used as the inputs 201 and the inputs 202 and the squared channel responses $(h_k)^2$ as squared channel responses 203 for training of the neural network 200.

According to an example, neural networks 200 are trained for different band gap widths W and used in channel recovery step 102. Depending on the gap width W, the corresponding neural network 200 is then selected to recover the squared channel responses. A set of T neural networks 200 may then be provided wherein the first neural network 200 is trained for recovering gaps of width W=1 and the last neural network 200 is trained for recovering gaps of width W=T. Each neural network 200 may be provided with one hidden layer 212 with 20 neurons. For propagating forward in a neural network that is trained for recovering the gap of width W, the required number of real multiplications and real additions required are 126W and 126W, respectively. 126W is obtained as follows: 4 W×20 real multiplications and additions are required for propagating from the input layer 210 to the hidden layer 212; 2W×20 real multiplications and additions are required for propagating from the hidden layer 212 to the output layer 211; 4W real multiplications and additions are required for the input layer normalization; and 2 W real multiplications and additions are required for the output layer normalization. Further, the total number of real values that has to be stored as the parameters of the set of T neural networks is:

$$\Sigma_{i=1}^{T}(120i)+(20+2i)+(12i)=67T^2+87T \quad \text{(Eq. 8)}$$

wherein 120i is the total number of stored weights required for forward propagating from input to output in the trained neural network for a gap width of i. In particular, 4i×20 weights out of 120i weights are required for forward propagation from the input layer 210 to the hidden layer 212 and 2i×20 weights out of 120i weights are required for forward propagating from the hidden layer 212 to the output layer 211. 20+2i is total number of biases in the trained neural network for a gap width of i. Furthermore, 121 is the total number of values required to be stored for input and output normalization of the neural network 200. In particular, 4i×2 and 2i×2 values out of 121 are for input layer and output layers normalization, respectively. Assuming T=10, the total memory required for implementing the set of ten neural networks for single-precision and double-precision floating-point are 30.2 Kbytes and 60.5 Kbytes, respectively. The complexity of the super resolution algorithms are mainly due to the eigenvalue decomposition and scales as $O(N^3)$, wherein N is the number of the frequency channels used for ranging. This complexity is then 400 times larger than the complexity of the forward propagation in a neural network 200 that is trained for a channel gap of length 10. It is therefore a potential benefit that the complexity of the channel recovery step 102 is negligible compared to the super resolution algorithms used for the final range estimation step 104.

Figure 3:
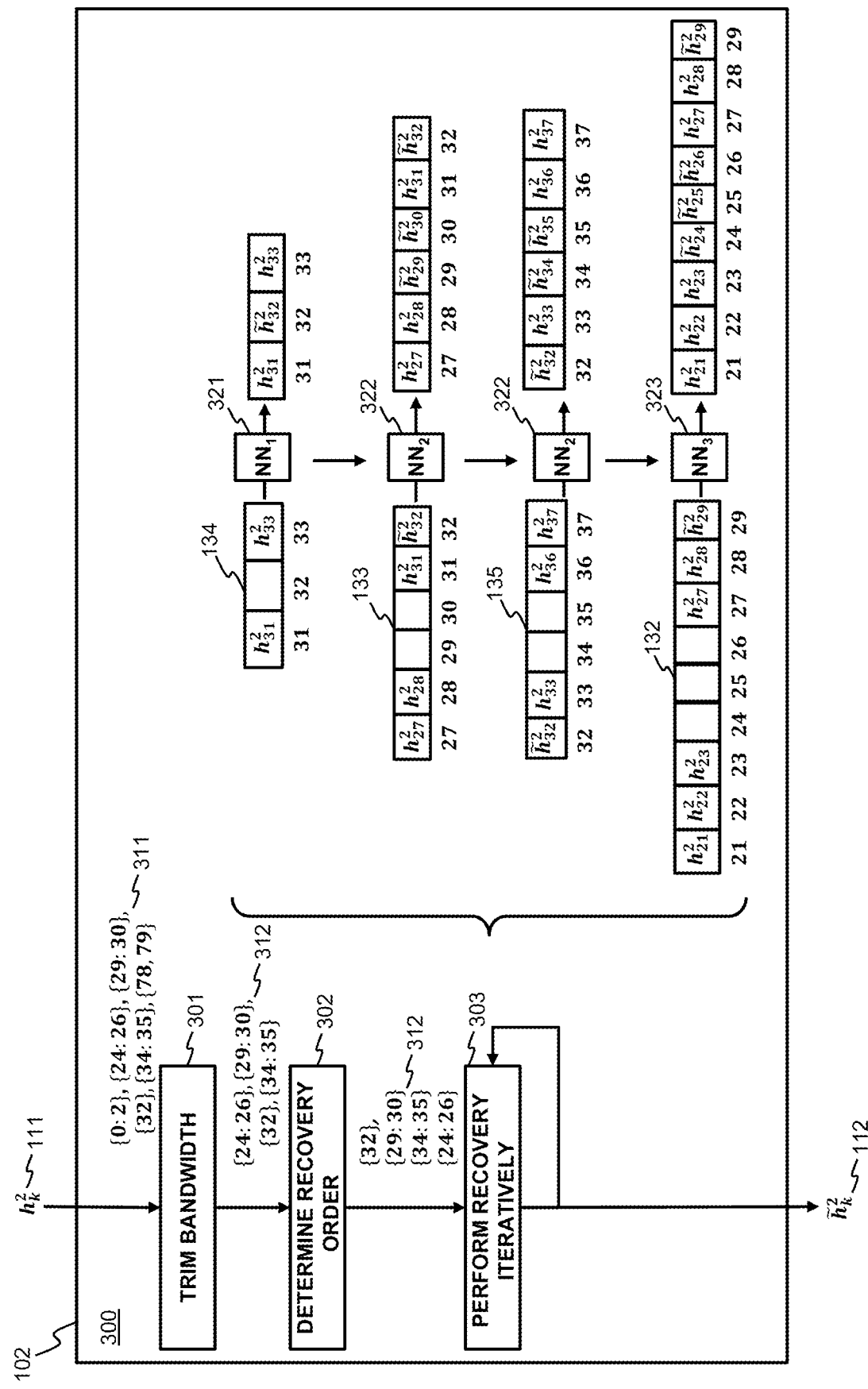
FIG. 3 shows a method for estimating squared channel responses within a band gap from squared channel responses adjacent to the band gap, according to an example.

FIG. 3 illustrates a method 300 for performing the channel recovery step 102 as described with reference to FIG. 1 according to an example. The method 300 is further illustrated by the example for the measurement band 120 as also described in FIG. 1. According to a first step 301, the squared channel responses 111 of the available channel are trimmed. This trimming is performed to assure that neural network 200 will have all the squared channel responses 201 and the squared channel responses 202 for recovering the channel gaps. According to the example, the band gap 131 (e.g., {0:2}) does not have any adjacent carriers at lower frequencies because these carriers fall outside the measurement band 120. Because of this, the recovery by a neural network 200 with W=3 would not give a good estimation because the squared channel responses 201 are unknown. The same applies for the band gap 136 (e.g., {78:79}) that does not have any adjacent carriers at higher frequencies because these carriers also fall outside the measurement band 120. Because of this, the recovery by a neural network 200 with W=2 would not give a good estimation because the squared channel responses 202 are unknown. In order to overcome this, the band gap 131 and the band gap 136 are removed from the recovery method 300 by trimming step 301. As a result, there will be no squared channel responses 112 for these omitted band gaps and the final range estimation step 104 will be performed based on a smaller number of carriers, i.e. carriers 3 to 77 for the example, and band gaps 312.

The method then proceeds to step 302 in which a sequence or order for the band gaps 312 for performing the recovery step 303 is determined. The ordered list of band gaps 312 is determined such that the amount of unrecovered squared channel responses of one gap required for the recovery of another band gap is minimized. Referring to the example, one can observe that recovery of band gap 132 (e.g., {24:26}) requires carriers {21:23} and {27:29}. However, carrier 29 lies within band gap 133 and, therefore, the band gap 133 is for example resolved before the band gap 132. Similarly, one can observe that recovery of the band gap 133 (e.g., {29:30}) requires carriers {27:28} and {31:32}. However, carrier 32 lies within the band gap 134 and, therefore, the band gap 134 is for example resolved before the band gap 133. Further, the situation may occur that two band gaps require carriers from one another. In such case the smallest band gap may be estimated before the larger band gap wherein the unknown squared channel responses are zero padded. As a result of step 302, an ordered list of the band gaps 312 is produced.

The method 300 then proceeds to the recovery step 303 and performs the recovery iteratively according to the ordered list of the band gaps 312. According to an example, separate neural networks 321, 322, 323 are trained for each bandgap width. As such a first neural network 321 is provided for a band gap recovery of width W=1; a second neural network 322 is provided for a band gap recovery of width W=2; and a third neural network 323 is provided for a band gap recovery of width W=3. If there are no dependencies, then recoveries by different neural networks can be performed in parallel. For example, recovery of the band gap 135 and the band gap 132 by respective neural network 322 and neural network 323 may be performed in parallel. When all band gaps are resolved, then method 300 and thus the channel recovery step 102 is completed and channel reconstruction according to step 103 can start.

An ordering algorithm for determining the ordered list of band gaps 312 according to an example will now be described. The ordering algorithm is based on the above-described principle that it is better to recover the channel gaps for which the corresponding neural networks have all the required inputs before recovering channel gaps that have missing inputs. The ordering algorithm is further based on the principle that in case two channel gaps require mutual unrecovered channel gaps then the smallest channel gap is first resolved. As an example, consider that the channel gaps are at carriers {16:18} and {21:24}. In this case recovery of {16:18} requires the squared channel response of carrier index 21 which is included in the other channel gap {21:24}. Furthermore, recovering of {21:24} requires the squared channel response of indices 17 and 18, which are included in the channel gap {16:18}. In such case, the ordering algorithm will first recover the channel gap {16:18} with smaller size by considering that the squared channel responses of the larger gap {21:24} are zero. Then, the larger channel gap can be recovered based on using the recovered value of the squared channel responses of the smaller channel gap {16:18}. The reason is that the performance of channel recovery degrades with increasing channel gap width.

These two principles for determining the ordered list of band gaps 312 may be formalized in pseudo code as follows:

| Step | |
|---|---|
| 1. | Input: "input gap map" |
| 2. | Output: "output gap map" |
| 3. | Intermediate variables: |
| 4. | "available channel indices"; |
| 5. | "current gap map"; |
| 6. | "scheduled gaps"; |
| 7. | "not scheduled gaps"; |
| 8. | "old not scheduled gaps"; |
| 9. | Initialization: |
| 10. | Compute the "available channel indices" by removing the channel indices of the "input gap map" from the possible channel indices (frequency indices that will be used for ranging); |
| 11. | Initialize "current gap map" by "input gap map"; |
| 12. | Initialize "output gap map" as empty; |
| 13. | Initialize "scheduled gaps" as empty; |
| 14. | Initialize "not scheduled gaps" as empty; |
| 15. | Initialize "old output gap map" as empty; |
| 16. | While "current gap map" is not empty do: |
| 17. | For all channel gaps in "current gap map" do: |
| 18. | If the required channel indices for recovering of channel gap are in "available channel indices" do: |
| 19. | Add the channel gap to "scheduled gaps"; Else do: |
| 20. | Add the channel gap to "not scheduled gaps"; |
| 21. | If "not scheduled gaps" is empty do: |
| 22. | Attach all gaps in "scheduled gaps" to the "output gap map"; |
| 23. | "current gap map" is updated as empty; |
| 24. | exit the While loop; |
| 25. | Elseif "not scheduled gaps" is not the same as "old not scheduled gaps" do: |
| 26. | Sort the gaps in "not scheduled gaps" based on their width in an increasing order; |
| 27. | add these sorted gaps to "output gap map"; |

-continued

| Step | |
|---|---|
| 28. | Update "current gap map" as empty; |
| 29. | exit the While loop; |
| 30. | Else do: |
| 31. | Change the value of "current gap map" to "not scheduled gaps" |
| 32. | Attach all gaps in "scheduled gaps" to the "output gap map" |
| 33. | Update "available channel indices" by adding indices of "scheduled gaps" to it |
| 34. | Change the value of "old not scheduled gaps" to "not scheduled gaps" |

To illustrate this scheduling algorithm, the algorithm is applied to the measurement band 120 with the channel gaps 132-135. In this example, the ranges {0:2}, {24:26}, {29:30}, {32}, {34:35}, and {78:79} correspond to the indices of the channel gaps. Therefore, in this example the "input gap map" of step 1 is {24:26, 29:30, 32, 34:35}. It is further assumed that the trimming step 301 has been applied such that the first and last band gaps 131 and 136 will not be used for the final range estimation step 104. Under initialization step 9, "available channel indices" is initialized as {3:23, 27:28, 31, 33, 37:77} in step 10 by removing of "input gap map" from the channel indices used for ranging, i.e., {3:77}; "current gap map" is initialized as {24:26, 29:30, 32, 34:35} in step 11; and the other variables are initialized as empty lists in step 12 to 15. During a first iteration of the while loop under step 16 the following steps are performed: "scheduled gaps" and "not scheduled gaps" are calculated as {32} and {24:26, 29:30, 34:35}, respectively. This is due to the fact that for recovering of {24:26} the value of the squared channel response for channel index {29} is required, which is not available due to channel gap {29:30}. Furthermore, for recovery of {29:30} and {34:35}, the squared channel response at channel index {32} is required, which is not available due to channel gap {32}. For channel gap {32}, the required inputs ({31, 33}) are available. As "not scheduled gaps" is not the same as "old not scheduled gaps," the "else" step 30 will be executed. Under this step 30 "current gap map" is updated to {24:26, 29:30, 34:35}; "output gap map" and "available channel indices" are updated to {32} and {3:23, 27:28, 31:33, 37:77}, respectively; and "old not scheduled gaps" is also updated to {24:26, 29:30, 34:35}. Then the algorithm moves to the second iteration of the while loop under step 16. The "scheduled gaps" and "not scheduled gaps" are computed as {29:30, 34:35} and {24:26}, respectively. As "not scheduled gaps" is not the same as "old not scheduled gaps," in this second iteration also the "else" under step 30 will be executed. The "current gap map" will then be updated to {24:26}; the "output gap map" and "available channel indices" are updated to {32, 29:30, 34:35} and {3:23, 27:77}, respectively; and "old not scheduled gaps" is also updated to {24:26}. Then the algorithm moves to the third iteration of the while loop under step 16. The "scheduled gaps" and "not scheduled gaps" are computed as {24:26} and { }, respectively under this third iteration. As "not scheduled gaps" is empty the "if" step 21 will be executed. Under this step 21 the "output gap map" is updated to {32, 29:30, 34:35, 24:26} and "current gap map" is updated to empty. As "current gap map" is empty, the while loop will exit.

As described above, the channel recovery step 102 may be performed by using a set of T neural networks 200 wherein the first neural network is trained for recovering gaps of width W=1 and the last neural network is trained for recovering gaps of width W=T. According to a further example, this set of T neural networks 200 can be further pruned, i.e. less than T neural networks can be used for recovering gaps up to a width W=T. The potential benefit of such pruning is that less neural network parameters have to be stored. The principle for this pruning is that a neural network 200 that is trained for recovering the squared channel responses of a given gap width W can be pruned such that it can also be used for recovering the squared channel responses for smaller gaps. In the neural network 200, each two of the neurons of the output layer 211 contributes to four neurons of the input layer 210. As a result, by removing two neurons of the output layer 211 and four neurons of the input layer 210, the trained neural network for a gap width of W has the same structure as that of a neural network trained for a gap width of W−1. In general, a neural network trained for a gap width W can be pruned to get a neural network that can be used for recovering a gap of width W'; wherein W'<W. This can be achieved by removing the last 2(W−W') neurons of the output layer 211 and the corresponding weights for propagating from the hidden layer 212 to the output layer 211; by removing the first 2(W−W') neurons from the input layer 210 and the last 2(W−W') neurons from the input layer 210; and by removing the corresponding weights for propagating from the input layer 210 to the hidden layer 212.

Figure 4:
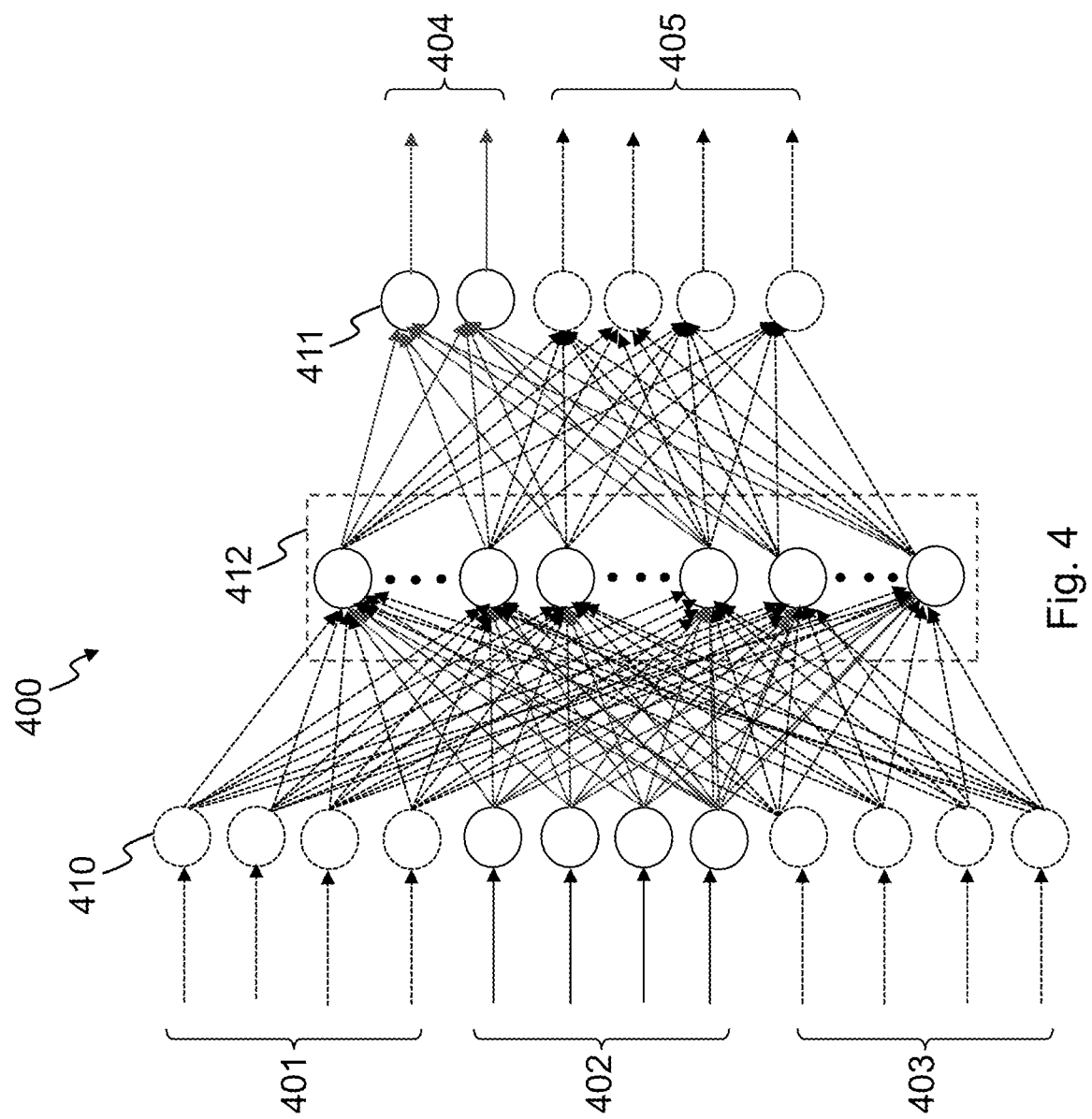
FIG. 4 shows a neural network that is pruned to estimate squared channel responses within a band gap that is smaller than the band gap the neural network was trained for, according to an example.

FIG. 4 illustrates an example of a neural network 400 that was trained for recovering a gap width of W=3 that has been pruned as described above for recovering a gap width of W'=1. The unpruned neural network 400 has 12 input nodes 410 of which the upper six correspond to the squared channel responses 201 for the carriers below the gap and the lower six inputs correspond to the squared channel responses 202 for the carriers above the gap. The unpruned neural network 400 also has 6 output nodes 411. By the pruning, the first four input nodes 401 and last four input nodes 403 are removed as shown by the dashed lines; the last four output nodes 405 are removed; and the connections between the removed nodes 401, 403, and 405 and the hidden layer 412 are removed. This results in the pruned neural network 400 with the four input nodes 402.

Table 1 below shows a possible pruning for a set of neural networks wherein T=10. The first column shows the gap width for which the neural network is used. The second column shows the original gap width of the neural network that was pruned to obtain the gap width of the first column. The last column indicates whether a pruned neural network is used for the gap width of column one.

TABLE 1

Pruning for gap width of 10

| Channel gap width | Neural network trained for gap width | Pruning |
|---|---|---|
| 1 | 10 | Yes |
| 2 | 10 | Yes |
| 3 | 5 | Yes |
| 4 | 5 | Yes |
| 5 | 5 | No |
| 6 | 8 | Yes |
| 7 | 8 | Yes |
| 8 | 8 | No |
| 9 | 9 | No |
| 10 | 10 | No |

Figure 5:
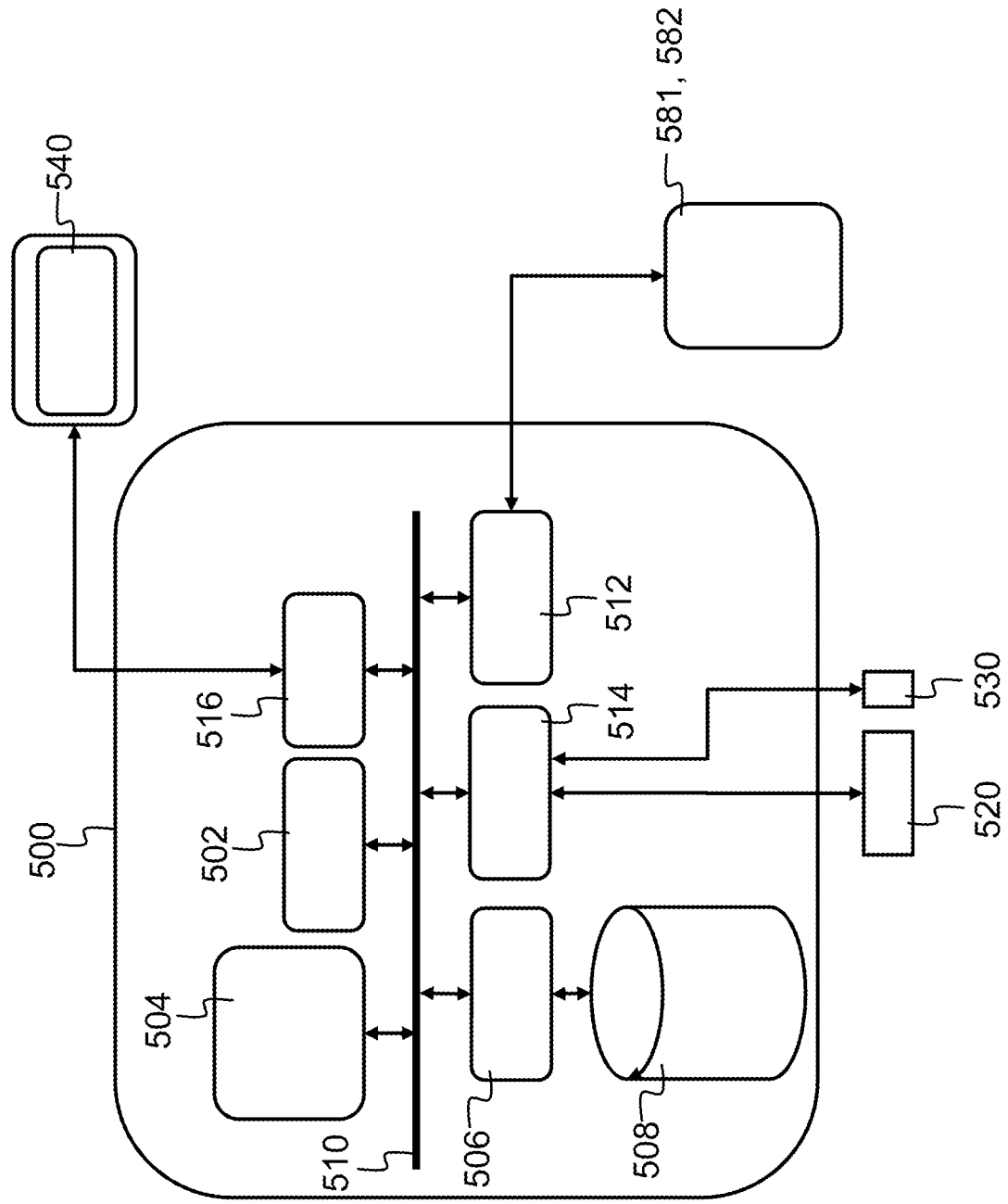
FIG. 5 shows a computing system for performing one or more steps of the disclosure, according to an example.

FIG. 5 shows a computing system 500 for performing methods and steps according to the described examples. The computing system 500 may for example be used for performing method 100 according to FIG. 1, for storing, using, and training neural networks 200 and 400 according respectively to FIG. 2 and FIG. 4, and for performing the method 300 according to FIG. 3. The computing system 500 may in general be formed as a suitable general-purpose computer and comprise circuitry such as a bus 510, a processor 502, a local memory 504, one or more input interfaces 514, one or more output interfaces 516, a communication interface 512, a storage element interface 506, and one or more storage elements 508. Bus 510 may comprise one or more conductors that permit communication among the components of the computing system 500. Processor 502 may include any type of conventional processor or microprocessor that interprets and executes programming instructions. Local memory 504 may include a random-access memory (RAM) or another type of dynamic storage device that stores information and instructions for execution by processor 502 and/or a read only memory (ROM) or another type of static storage device that stores static information and instructions for use by processor 502. Input interface 514 may comprise one or more conventional mechanisms that permit an operator or user to input information to the computing system 500, such as a keyboard 520, a mouse 530, a pen, voice recognition system and/or biometric mechanisms, a camera, etc. Output interface 516 may comprise one or more conventional mechanisms that provide information to the operator or user, such as a display 540, etc. Communication interface 512 may comprise any transceiver-like mechanism such as for example one or more Ethernet interfaces that enables computing system 500 to communicate with other devices and/or systems, for example with other computing devices 581, 582. The communication interface 512 of computing system 500 may be connected to such another computing system by means of a local area network (LAN) or a wide area network (WAN) such as for example the internet. Storage element interface 506 may comprise a storage interface such as a Serial Advanced Technology Attachment (SATA) interface or a Small Computer System Interface (SCSI) for connecting bus 510 to one or more storage elements 508, such as one or more local disks, for example SATA disk drives, and control the reading and writing of data to and/or from these storage elements 508. Although the storage element(s) 508 above is/are described as a local disk, in general any other suitable computer-readable media such as a removable magnetic disk, optical storage media such as a CD or DVD, -ROM disk, solid state drives, flash memory cards, etc. could be used. Computing system 500 may be part of an initiator or reflector according to the above examples. Computing system 500 may also be distinct from the initiator and reflector. In this case, the computing system 500 may receive the measurements 110 over communication interface 512 from the initiator and reflector.

As used in this application, the term "circuitry" may refer to one or more or all of the following:
(a) hardware-only circuit implementations such as implementations in only analog and/or digital circuitry and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and/or processor(s), such as microprocessor(s) or a portion of a microprocessor(s), that requires software (e.g. firmware) for operation, but the software might not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present disclosure has been illustrated by reference to specific embodiments, it will be apparent to those skilled in the art that the disclosure is not limited to the details of the foregoing illustrative embodiments, and that the present disclosure may be embodied with various changes and modifications without departing from the scope thereof. The present embodiments are therefore to be considered in all respects as illustrative and not restrictive, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first," "second," third," "a," "b," "c," and the like, when used in the description or in the claims are introduced to distinguish between similar elements or steps and are not necessarily describing a sequential or chronological order. Similarly, the terms "top," "bottom," "over," "under," and the like are introduced for descriptive purposes and not necessarily to denote relative positions. It is to be understood that the terms so used are interchangeable under appropriate circumstances and embodiments of the disclosure are capable of operating according to the present disclosure in other sequences, or in orientations different from the one(s) described or illustrated above.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method for performing multi-carrier phase-based ranging between a first radio and a second radio, the method comprising:
calculating first squared channel responses based on channel measurements between the first radio and the second radio, the first squared channel responses corresponding to available carriers within a measurement band that has a band gap having one or more unusable carriers, the one or more unusable carriers being unusable for calculating the first squared channel responses;

estimating, via a trained neural network, second squared channel responses for the one or more unusable carriers based on the first squared channel responses of the available carriers adjacent to the band gap; and estimating a distance between the first radio and the second radio based on the first squared channel responses and the second squared channel responses.

2. The method according to claim 1, further comprising obtaining the channel measurements from tones transmitted and received by the first radio and the second radio at frequencies of the available carriers.

3. The method according to claim 2, wherein the channel measurements comprise in-phase and quadrature components.

4. The method according to claim 1, wherein calculating the first squared channel responses comprises calculating the first squared channel responses based on a multiplication of the channel measurements at the first radio with the channel measurements at the second radio.

5. The method according to claim 1, wherein the first squared channel responses of the available carriers adjacent to the band gap comprise the first squared channel responses having a lower frequency than the band gap and the first squared channel responses having a higher frequency than the band gap.

6. The method according to claim 5, wherein a first number of the available carriers adjacent to and having a lower frequency than the band gap and a second number of the available carriers adjacent to and having a higher frequency than the band gap are greater than or equal to a third number of the unusable carriers in the band gap.

7. The method according to claim 1, wherein estimating the second squared channel responses for the one or more unusable carriers further comprises selecting the trained neural network from a set of trained neural networks according to a number of the unusable carriers in the band gap.

8. The method according to claim 7, wherein at least one trained neural network of the set of trained neural networks is configured to perform the estimating for different numbers of the unusable carriers.

9. The method according to claim 1, wherein the band gap is a first band gap and the unusable carriers are first unusable carriers, wherein the measurement band comprises a second band gap having one or more second unusable carriers, and wherein the estimating comprises:

determining an estimation order for the estimating; and estimating the second squared channel responses for the first unusable carriers and third squared channel responses for the second band gap according to the estimation order.

10. The method according to claim 9, wherein the estimation order is determined according to a condition that:

if estimating the third squared channel responses requires the second squared channel responses, then estimate the second squared channel responses before the third squared channel responses.

11. The method according to claim 9, wherein the estimation order is determined according to a condition that:

if estimating the third squared channel responses requires the second squared channel responses and vice versa, and if the first band gap is smaller than the second band gap, then estimate the second squared channel responses before the first squared channel responses.

12. A computing system comprising:

one or more processors; and a computer readable medium storing instructions that, when executed by the one or more processors, cause the computing system to perform functions for multi-carrier phase-based ranging between a first radio and a second radio, the functions comprising:

calculating first squared channel responses based on channel measurements between the first radio and the second radio, the first squared channel responses corresponding to available carriers within a measurement band that has a band gap having one or more unusable carriers, the one or more unusable carriers being unusable for calculating the first squared channel responses;

estimating, via a trained neural network, second squared channel responses for the one or more unusable carriers based on the first squared channel responses of the available carriers adjacent to the band gap; and estimating a distance between the first radio and the second radio based on the first squared channel responses and the second squared channel responses.

13. The computing system according to claim 12, the functions further comprising obtaining the channel measurements from tones transmitted and received by the first radio and the second radio at frequencies of the available carriers.

14. The computing system according to claim 13, wherein the channel measurements comprise in-phase and quadrature components.

15. The computing system according to claim 12, wherein calculating the first squared channel responses comprises calculating the first squared channel responses based on a multiplication of the channel measurements at the first radio with the channel measurements at the second radio.

16. The computing system according to claim 12, wherein the first squared channel responses of the available carriers adjacent to the band gap comprise the first squared channel responses having a lower frequency than the band gap and the first squared channel responses having a higher frequency than the band gap.

17. The computing system according to claim 16, wherein a first number of the available carriers adjacent to and having a lower frequency than the band gap and a second number of the available carriers adjacent to and having a higher frequency than the band gap are greater than or equal to a third number of the unusable carriers in the band gap.

18. The computing system according to claim 12, wherein estimating the second squared channel responses for the one or more unusable carriers further comprises selecting the trained neural network from a set of trained neural networks according to a number of the unusable carriers in the band gap.

19. The computing system according to claim 18, wherein at least one trained neural network of the set of trained neural networks is configured to perform the estimating for different numbers of the unusable carriers.

20. A non-transitory computer readable medium storing instructions that, when executed by a computing system, cause the computing system to perform functions for multi-carrier phase-based ranging between a first radio and a second radio, the functions comprising:

calculating first squared channel responses based on channel measurements between the first radio and the second radio, the first squared channel responses corresponding to available carriers within a measurement band that has a band gap having one or more unusable carriers, the one or more unusable carriers being unusable for calculating the first squared channel responses;

estimating, via a trained neural network, second squared channel responses for the one or more unusable carriers based on the first squared channel responses of the available carriers adjacent to the band gap; and estimating a distance between the first radio and the second radio based on the first squared channel responses and the second squared channel responses.

* * * * *